(12) United States Patent
Imanari et al.

(10) Patent No.: US 6,542,313 B2
(45) Date of Patent: Apr. 1, 2003

(54) LENS BARREL POSITION DETECTING DEVICE AND METHOD

(75) Inventors: Hitoshi Imanari, Yokohama (JP); Kazumitsu Takezawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/995,651

(22) Filed: Nov. 29, 2001

(65) Prior Publication Data

US 2002/0063971 A1 May 30, 2002

(30) Foreign Application Priority Data

Nov. 29, 2000 (JP) ........................................ 2000-362058

(51) Int. Cl.[7] .............................. G02B 15/14; G02B 7/02
(52) U.S. Cl. ........................................ 359/694; 359/823
(58) Field of Search ................................ 359/694, 703, 359/704, 823

(56) References Cited

U.S. PATENT DOCUMENTS 5,291,335 A * 3/1994 Ogino ........................ 359/694
5,909,320 A * 6/1999 Oono et al. ................. 359/696
6,002,530 A * 12/1999 Nakashima et al. ......... 359/700

FOREIGN PATENT DOCUMENTS

JP         409127398 A    *  5/1997    ............ G02B/7/04

* cited by examiner

*Primary Examiner*—Ricky Mack
(74) *Attorney, Agent, or Firm*—Oliff & Berridge PLC

(57) ABSTRACT

A position detecting device is used with a lens barrel that includes an optical system, an optical system driving member that moves at least part of the optical system, and a driving force transmitting member that transmits rotational driving force from a driving source to the optical system driving member. The position detecting device includes a linear moving member that converts rotational motion of the driving force transmitting member into a linear motion, and a detector that detects the linear movement of the linear moving member. This arrangement is capable of providing a very compact structure. The driving force transmitting member can be a rotating shaft-like member that rotates through at least one rotation. The position detecting device also can include a backlash eliminating member (e.g., a spring) that eliminates a backlash between the driving force transmitting member and the linear moving member.

30 Claims, 2 Drawing Sheets

LENS BARREL POSITION DETECTING DEVICE AND METHOD

INCORPORATION BY REFERENCE

The disclosure of Japanese Priority Application No. 2000-362058 filed Nov. 29, 2000, is incorporated herein by reference in its entirety.

BACKGROUND OF THE INVENTION

1. Field of Invention

The invention relates to a position detecting device and method of a lens barrel that adjusts lens focusing and changes a focal length of an optical system by moving a focusing lens group back and forth along an optical axis.

2. Description of Related Art

It is known to provide a lens barrel that adjusts lens focusing and changes a focal length by moving a focusing lens group back and forth along an optical axis. One known type of such device detects a position of a member, such as a cam barrel, by using a position detecting device. The detected member is driven in the lens barrel upon auto focusing or changing of a focal length, and then the lens obtains information on a focusing distance and a focal length, thereby controlling camera exposure or flash amount.

For example, in order to obtain a focusing distance in the conventional lens, a distance measuring encoder is used. One method of arranging the distance measuring encoder within the lens is to place it between a fixed barrel and a member for rotating a worm gear or a cam mechanism for driving a focusing lens, in which the member rotates about the optical axis without moving along the optical axis. The rotational position of the member is measured to know the lens position. Another method for arranging the distance measuring encoder within the lens is to place it so as to detect direct movement of a focusing lens in a direction along the optical axis.

In the former method, the member rotating about the optical axis is provided at the last stage of a gear mechanism of a lens driving mechanism, and rotates the worm gear or the cam for driving the focusing lens. The distance measuring encoder for detecting distance information is placed between the rotating member of the last stage and the fixed barrel. In this case, a brush for detecting distance information is attached to the rotating member, and a flexible printed circuit board having an encoder pattern for indicating a position is attached to the fixed barrel. Thus, the brush detects distance information based upon its position.

In the latter method, in order to detect direct movement of a focusing lens in a direction of the optical axis by using the distance detecting encoder, the brush for detecting distance information and the flexible printed circuit board having an encoder pattern are provided near the focusing lens.

However, in the former case, for example, as the rotating member of the last stage of the gear mechanism rotates about the optical axis and rotates the worm gear or the cam mechanism for driving the focusing lens, it is necessary to have some space in which the last-stage rotating member is supported and rotated through an angle of 360° inside the fixed member. Then, in a type of zoom lens in which a focusing lens group is arranged on the subject side and a rear lens group is moved toward the front of the zoom lens by zooming, a lens frame of the rear lens group must be arranged inside the rotating member that is rotated about the optical axis. This type of arrangement requires a certain amount of space, which makes it difficult to reduce the size of the lens.

In the latter case, in order to detect direct movement of the focusing lens in a direction of the optical axis by using the distance measuring encoder, the brush for detecting a distance and the flexible printed circuit board having the encoder pattern are placed near the focusing lens. A lens in which a focusing lens group is moved by zooming is often used in this case. In this type of zoom lens, when the brush for detecting a distance and the flexible printed circuit board having the encoder pattern are placed near a focusing lens, the flexible printed circuit board is attached to a member that is moved while zooming is performed. Since the flexible printed circuit board needs to be long enough to move with this member during zooming, the flexible printed circuit board is accommodated into the lens barrel in a manner such that the flexible printed circuit board is folded in the shape of an "S". However, this manner of accommodation causes a problem in that a large space is needed to contain the flexible printed circuit board in the lens barrel. In addition, since the flexible printed circuit board is bent each time a zooming operation is performed, the flexible printed circuit board can become damaged and degraded over time.

SUMMARY OF THE INVENTION

It is one object of the invention to provide a position detecting device and method of a lens barrel that has a smaller size, high space-usage efficiency, high durability and high reliability.

According to one aspect of the invention, which is applicable to a lens barrel including an optical system, an optical system driving member that moves at least part of the optical system, and a driving force transmitting member that transmits rotational driving force from a driving source to the optical system driving member, a position detecting device is provided that includes a linear moving member that converts rotational motion of the driving force transmitting member into a linear motion, and a detecting unit (detector) that detects the linear movement of the linear moving member. This aspect of the invention is capable of addressing the problems discussed above, for example.

According to another aspect of the invention, the driving force transmitting member is a rotating shaft-like member that rotates through at least one rotation.

According to another aspect of the invention, the position detecting device includes a backlash eliminating member that eliminates a backlash between the driving force transmitting member and the linear moving member by moving toward one direction. According to a preferred embodiment, the backlash eliminating member includes a spring.

BRIEF DESCRIPTION OF THE DRAWINGS

The invention will be described in detail with reference to the following drawings, in which like reference numerals are used to identify similar elements, and wherein.

DETAILED DESCRIPTION OF PREFERRED EMBODIMENTS

Figure 1:
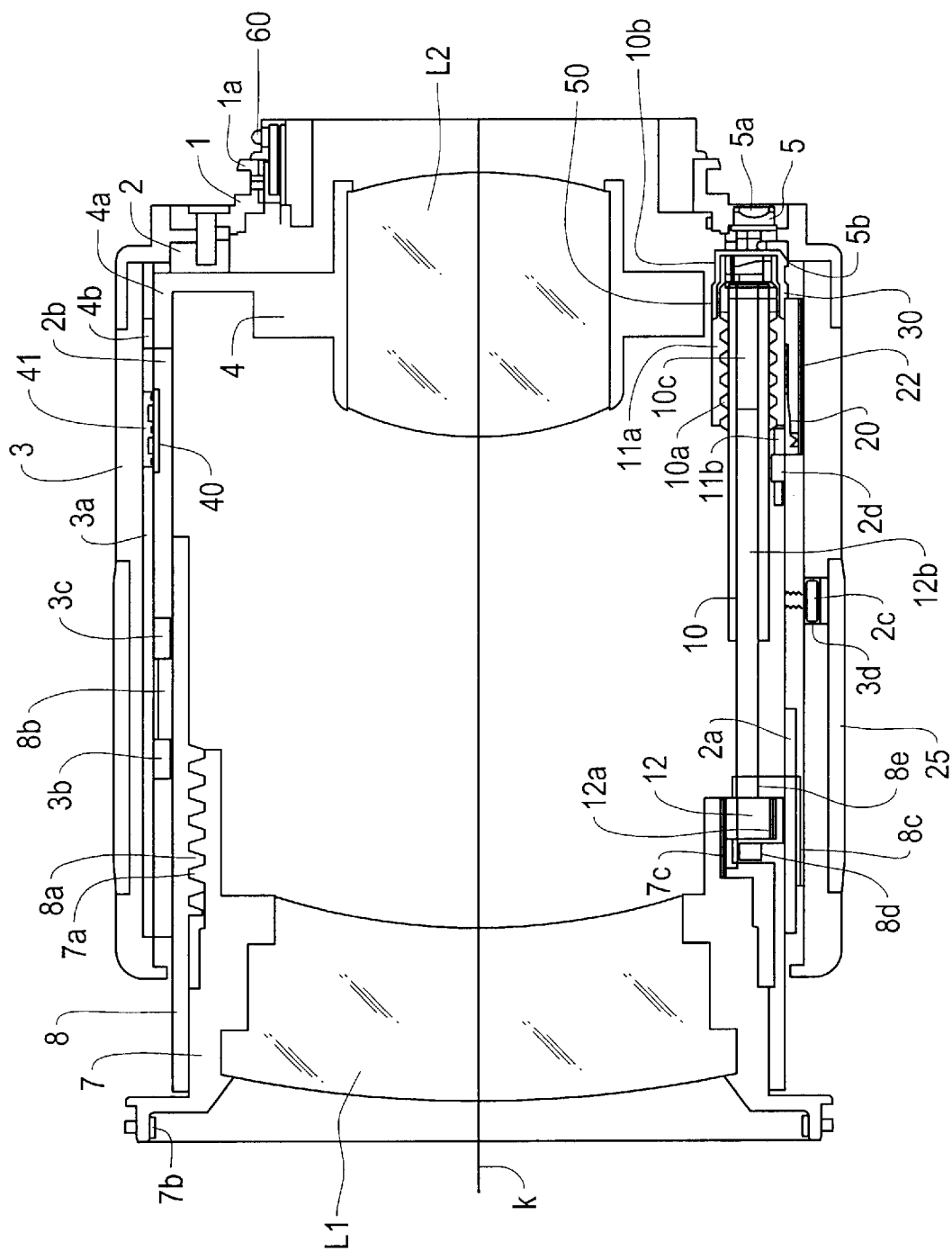
FIG. 1 is a sectional view of a position detecting device of a lens barrel according to an embodiment of the invention.

A first embodiment of the invention will be described in detail with reference to FIG. 1, which illustrates a position detecting device of a lens barrel in accordance with this first embodiment of the invention.

The lens barrel according to the first embodiment includes a lens mount 1, fixed barrel 2, zoom ring 3, second lens group frame 4, coupler 5, first lens frame 7, first lens group driver 8, first driver 10, linear moving element 11, second driver 12, distance detecting brush 20, flexible printed circuit board 22, first lens group L1, second lens group L2 and coil spring 50.

Lens mount 1 is a male mount for engaging with a female mount (not shown) of a camera. Lens mount 1 includes bayonet portion 1a. Lens mount 1 also includes electric contact 60, which is attached to an inner surface of lens mount 1, and is connected to a PU (processing unit—not shown) within the lens, for communicating with a CPU of the camera body (not shown).

Fixed barrel 2, which is incorporated with the lens mount 1, includes linear key groove 2a, linear guide slot 2b and follower pin 2c. Linear key groove 2a is one of three linear grooves formed on an inner surface of fixed lens barrel 2. Linear guide slot 2b linearly guides second lens group frame 4 of second lens group L2. Follower pin 2c, which is fixed to fixed barrel 2, engages with guide slot 3d. Flexible printed circuit board 40, which includes an encoder pattern for use in detecting a zoom position, is attached around an outer periphery of fixed barrel 2, and detects a zoom position when brush 41 mounted to zoom ring 3 is rotated. The flexible printed circuit board 40 is connected to a CPU (not shown) within the lens.

Zoom ring 3 performs zooming by rotation about the optical axis k, and has lead slot 3a, follower pins 3b, 3c, and guide slot 3d. Lead slot 3a engages with follower portion 4b, which is formed on an outer periphery of second lens group frame 4. Follower pins 3b and 3c project inside of zoom ring 3 at three positions, respectively. They engage with protruded first lens group driving cam 8b, which protrudes from an outer periphery of first lens group driver 8. Guide slot 3d is formed on zoom ring 3 and extends through a zooming angle. Rubber ring 25 is attached around zoom ring 3.

Second lens group frame 4 holds second lens group L2 and has linear key 4a and follower portion 4b. Linear key 4a is formed at three positions of an outer wall of second lens group frame 4, which engages with linear guide slot 2b of fixed barrel. 2. The follower portion 4b, which is formed on outer side of linear key 4a engages with lead slot 3a.

Coupler 5 has recess 5a and receives driving force from the camera at the surface of lens mount 1. Coupler 5 has a shaft, and pinion gear 5b is provided at the end of the shaft opposite to coupler 5. A part of pinion gear 5b engages with plate 30, and pinion gear 5b can rotate together with coupler 5.

First lens frame 7 holds first lens group L1 and moves first lens group L1 by using a worm gear. First lens frame 7 has male screw 7a on an outer periphery thereof, and attachment screw 7b. First lens frame 7 also has gear portion 7c, which is formed on male screw 7a through a given angle, for receiving driving force.

First lens group driver 8 includes female screw 8a formed on an inner surface thereof. The female screw 8a engages with male screw 7a. The first lens group driver 8 also has protruding first lens group driving cam 8b on an outer periphery thereof, which engages with follower pins 3b and 3c of zoom ring 3. Linear key 8c is also formed on another part of the outer periphery of first lens group driver 8, being located apart from protruded first lens group driving cam 8b by a given angle about optical axis k. Linear key 8c engages with linear key groove 2a. Furthermore, bearing 8d for a shaft of second driver 12 and retainer 8e for pinion gear 12a are provided on the inner surface of first lens group driver 8.

First driver 10, which is a shaft-like driving force transmitting member, transmits driving force from coupler 5 to second driver 12. First driver 10 includes male lead screw 10a formed on its outer surface, driving transmission gear 10b that engages with pinion gear 5b, and square-shaped hole 10c for transmitting driving force. Second driver 12 transmits driving force from first driver 10 to first lens frame 7. Square-shaped shaft 12b of second driver 12 engages with hole 10c of first driver 10. Pinion gear 12a engages with gear 7c of first lens frame 7. Since square-shaped shaft 12b engages with hole 10c, movement of second driver 12 in a direction of the optical axis does not stop transmitting driving force from first driver 10 to first lens frame 7. That is, shaft 12b can slide within hole 10c while still rotating with first driver 10.

Female lead screw 11a of linear moving element 11 engages with male lead screw 10a of first driver 10. Linear guide slot 11b of linear moving element 11 engages with linear key 2d of fixed barrel 2. Therefore, rotational motion of first driver 10 is converted to linear motion (by the engagement between male lead screw 10a and female lead screw 11a), and linear moving element 11 moves linearly. Linear moving element 11 has distance detecting brush 20. Thus, distance detecting brush 20 moves linearly together with linear moving element 11. Distance detecting brush 20 has electrical contacts that contact flexible printed circuit board 22.

Flexible printed circuit board 22 includes an encoder pattern printed in a direction of the optical axis k. Flexible printed circuit board 22 together with distance detecting brush 20 serve as a detection unit (or detector) for detecting linear movement of linear moving element 11, thereby detecting a focusing point. Flexible printed circuit board 22 is connected to a CPU (not shown) in the lens barrel.

First lens group L1 is a front lens group that is held by first lens frame 7. First lens group L1 moves linearly to perform zooming and simultaneously move linearly and rotationally to perform focusing. Second lens group L2 is a rear lens group that is held by second lens group holding frame 4. Second lens group L2 moves linearly to perform zooming.

Coil spring 50 is set between driving transmission gear 10b of first driver 10 and linear moving element 11. If coil spring 50 is not placed at this location, when linear moving element 11 is moved back and forth, a backlash is produced between male lead screw 10a and female lead screw 11a. This backlash causes a travel difference between back and forth travels of linear moving element 11.

Zooming and focusing will now be explained.

With respect to zooming, first protruded lens group driving cam 8b used for the first lens group contacts each of follower pins 3b and 3c that are placed across protruded first lens group driving cam 8b, and linear key 8c engages with linear key groove 2a. Then, when zoom ring 3 is rotated about optical axis k, zoom driving of first lens group L1 is performed in a direction of the optical axis. Further, linear key 4a of second lens group frame 4 engages with linear guide slot 2b, and follower portion 4b formed on the outer periphery of second lens group frame 4 engages with lead slot 3a of zoom ring 3. Therefore, rotation of zoom ring 3 about optical axis k performs zoom driving of second lens group L2 along the optical axis. Then, a zooming position is detected by flexible printed circuit board 40 and brush 41 and transmitted to the camera.

With respect to focusing, first manual focusing will be explained. Linear key 8c of first lens group driver 8 engages with linear key groove 2a of fixed barrel 2, and first lens group driver 8 engages with first lens frame 7 through male screw 7a and female screw 8a. Therefore, when first lens frame 7 is rotated manually, first lens group L1 is moved in a direction along the optical axis, focusing on an object.

With respect to auto focusing, driving force is transmitted from the camera (not shown) to gear portion 7c of first lens frame 7 through coupler 5, pinion gear 5b, first driver 10 and second driver 12. Then, first lens frame 7 is rotated by the transmitted driving force, and then first lens group L1 is moved in a direction along the optical axis, focusing on an object.

In both auto focusing and manual focusing, when focusing is performed, linear moving element 11 moves linearly and produces position information (distance information) of first lens group L1. This position information is detected by a detecting unit that includes distance detecting brush 20 and flexible printed circuit board 22, and is transmitted to the camera through a CPU within the lens. Therefore, in accordance with this embodiment of the invention, by converting rotational motion of first driver 10 to linear motion, and detecting the movement of linear moving element 11 using the detecting unit having distance detecting brush 20 and flexible printed circuit board 22, it is possible to downsize a unit required to detect a focusing position. Therefore, the lens barrel can be constructed with high space-usage efficiency and can be made smaller.

Furthermore, in accordance with this embodiment of the invention, since flexible printed circuit board 22 does not deform itself upon zooming and focusing, the flexible printed circuit board 22 does not become damaged and degraded due to bending.

Although the invention has been described with respect to one embodiment, changes may be made to the embodiment. For example, although the distance detecting brush 20 is attached to linear moving element 11 and flexible printed circuit board 22 is fixed in the first embodiment, the flexible printed circuit board 22 may be attached to a member that moves linearly and distance detecting brush 20 may be fixed, particularly if low resolution of position detection is acceptable.

Furthermore, although coil spring 50 is arranged to eliminate a backlash between first driver 10 and linear moving element 11 in this first embodiment, a coil spring need not be used depending upon the accuracy and position resolution that is desired.

Furthermore, although a lens barrel of the first embodiment is a type of lens barrel used in a lens-exchangeable camera, the lens barrel may be of a type that is permanently fixed to the camera body.

The invention can be used with film cameras as well as with digital cameras. A second embodiment, in which the invention is applied to a digital still camera will now be described.

Figure 2:
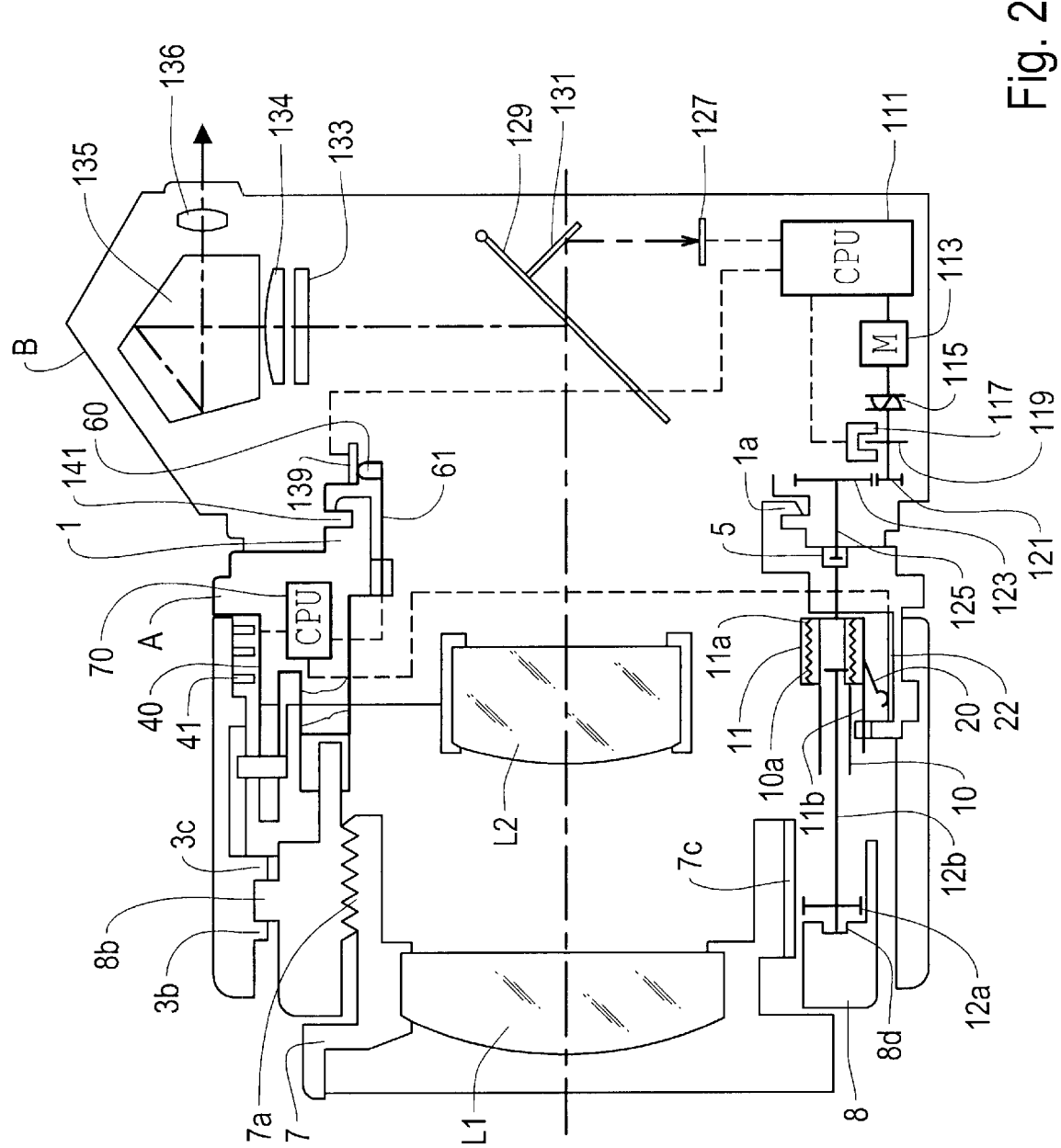
FIG. 2 is a sectional view of a position detecting device of a lens barrel attached to a digital camera according to a second embodiment of the invention.

FIG. 2 is a schematic view schematically showing an arrangement in which a lens barrel A is mounted to a camera body B of a digital camera. Furthermore, parts which are the same as in FIG. 1 are identified with the same numbers as used in FIG. 1. In FIG. 2, if a shooting lens A is mounted in a lens mount 141 of the camera main body B side via a bayonet portion 1a arranged on a lens mount 1, a coupler 5 on the lens side is coupled with a coupler 125 on the camera main body side. The coupler 125 is rotationally driven via a friction clutch 115 and a decelerating gear train 121, 123 by a motor 113 which is controlled by a driving signal of a CPU 111 within the main camera body.

Light from an object which has passed through a shooting optical systems L1, L2 forms an object image on a focus plate 133 after part of the light is reflected by a movable mirror 129. This object image is observed via a condenser lens 134, a pentaprism 135, and a viewfinder eye piece lens 136.

Part of the light which has passed through a transmissive portion of the mirror arranged at the center of the movable mirror 129 is reflected by a sub mirror 131 and is imaged on a light receiving surface of a pair of light receiving devices 127 (e.g., a CCD or other type of photodetector) that includes an imaging lens. Signals which are photoelectrically converted by the light receiving device 127 are sent to the CPU 111 within the body, and a defocus amount (the amount and direction of image plane shift from the intended focal plane) is obtained in response to the imaging state.

The CPU 111 within the body is electrically connected to a CPU 70 within the lens via lens electric contacts 60 and 61 and a body side electric contact 139, and various information relating to the lens can be read from a ROM inside the CPU 70. Furthermore, information showing an image plane shift amount for each unit rotation of the coupling is read, and a motor driving amount necessary to focus is obtained from the above-mentioned defocus amount. When motor driving begins, a pulse signal is generated in response to a motor shaft rotation amount by a photo interrupter 117 and an encoder disk 119 provided on the motor shaft, so when a pulse is generated which is equivalent to a predetermined desired motor rotation amount, motor driving will be suspended and focus is achieved.

As described above, in accordance with aspects of the invention, since a position detecting device of a lens barrel includes an optical system driving member that moves at least part of the optical system, a driving force transmitting member that transmits rotational driving force from a driving source to a helical member or a cam member, a linear moving member that converts rotational motion to linear motion and moves linearly, and a detector that includes a linear movement of the linear moving member, a lens barrel can be constructed with high space-usage efficiency, resulting in a smaller lens. This can make a circuitry used for the detecting unit, such as an encoder, naturally compact. Therefore, this detecting unit can have more improved durability and a lower cost than a detecting unit having an "S" shaped flexible printed circuit board. In addition, by adopting a backlash eliminating member, the linear moving member can engage with the driving force transmitting member without a travel difference between back and forth travels thereof. Therefore, it is possible to measure a lens position very accurately.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A position detecting device of a lens barrel that includes an optical system, an optical system driving member that moves at least part of the optical system, and a driving force transmitting member that rotates and transmits rotational driving force from a driving source to the optical system driving member, the position detecting device comprising:

a linear moving member that converts rotational motion of the driving force transmitting member into a linear motion, such that the linear moving member moves linearly; and a detector that detects the linear movement of the linear moving member;

wherein the linear moving member and the driving force transmitting member each have lead screws that engage with each other to cause the linear moving member to move linearly as the driving force transmitting member rotates.

2. A position detecting device according to claim 1, wherein the driving force transmitting member is a rotating shaft that rotates through at least one rotation.

3. A position detecting device according to claim 1, further comprising a backlash eliminating member that eliminates a backlash between the driving force transmitting member and the linear moving member by applying a force in one direction.

4. A position detecting device according to claim 3, wherein the backlash eliminating member includes a spring.

5. A position detecting device according to claim 1, wherein the detector includes a printed circuit board and an electric contact member, a first one of the printed circuit board and the electric contact member attached to the linear moving member, and a second one of the printed circuit board and the electric contact member attached to a stationary portion of the lens barrel.

6. A position detecting device according to claim 5, wherein the printed circuit board does not bend when the linear moving member moves.

7. A position detecting device of a lens barrel that includes an optical system, an optical system driving member that moves at least part of the optical system, and a driving force transmitting member that rotates and transmits rotational driving force from a driving source to the optical system driving member, the position detecting device comprising:

a linear moving member that converts rotational motion of the driving force transmitting member into a linear motion, such that the linear moving member moves linearly; and a detector that detects the linear movement of the linear moving member;

wherein the driving force transmitting member is a rotating shaft that rotates through at least one rotation.

8. A position detecting device according to claim 7, further comprising a backlash eliminating member that eliminates a backlash between the driving force transmitting member and the linear moving member by applying a force in one direction.

9. A position detecting device according to claim 8, wherein the backlash eliminating member includes a spring.

10. A position detecting device according to claim 7, wherein the detector includes a printed circuit board and an electric contact member, a first one of the printed circuit board and the electric contact member attached to the linear moving member, and a second one of the printed circuit board and the electric contact member attached to a stationary portion of the lens barrel.

11. A position detecting device according to claim 10, wherein the printed circuit board does not bend when the linear moving member moves.

12. A lens barrel comprising:

an optical system having at least one movable lens element;

an optical system driving member that moves the at least one movable lens element of the optical system;

a driving force transmitting member that rotates to transmit a rotational driving force from a driving source to the optical system driving member;

a linear moving member that converts rotational motion of the driving force transmitting member into a linear motion, such that the linear moving member moves linearly; and a position detector that detects the linear movement of the linear moving member;

wherein the driving force transmitting member is a rotating shaft that rotates through at least one rotation.

13. A lens barrel according to claim 12, wherein the linear moving member and the driving force transmitting member each have lead screws that engage with each other to cause the linear moving member to move linearly as the driving force transmitting member rotates.

14. A lens barrel according to claim 12, wherein the linear moving member moves in a direction parallel to an optical axis of the lens barrel.

15. A lens barrel according to claim 12, wherein the position detector includes a printed circuit board and an electric contact member, a first one of the printed circuit board and the electric contact member attached to the linear moving member, and a second one of the printed circuit board and the electric contact member attached to a stationary portion of the lens barrel.

16. A lens barrel according to claim 15, wherein the printed circuit board does not bend when the linear moving member moves.

17. A lens barrel according to claim 12, further comprising a backlash eliminating member that eliminates a backlash between the driving force transmitting member and the linear moving member by applying a force in one direction.

18. A lens barrel according to claim 17, wherein the backlash eliminating member includes a spring.

19. A method of detecting a position of an optical component of a lens barrel that includes an optical system that has the optical component, an optical system driving member that moves at least the optical component of the optical system, and a driving force transmitting member that rotates and transmits rotational driving force from a driving source to the optical system driving member, the method comprising:

causing a linear moving member to move linearly by converting a rotational motion of the driving force transmitting member into a linear motion of the linear moving member; and detecting the linear movement of the linear moving member;

wherein the linear moving member is caused to move linearly as the driving force transmitting member rotates by providing lead screws that engage with each other on the linear moving member and on the driving force transmitting member.

20. A method according to claim 19, wherein the detecting step includes providing a first one of a printed circuit board and an electric contact member on the linear moving member, and providing a second one of the printed circuit board and the electric contact member on a stationary portion of the lens barrel, wherein the printed circuit board does not bend when the linear moving member moves.

21. A position detecting device of a lens barrel that includes an optical system, an optical system driving member that moves at least part of the optical system, and a driving force transmitting member that rotates and transmits rotational driving force from a driving source to the optical system driving member, the position detecting device comprising:

a linear moving member that converts rotational motion of the driving force transmitting member into a linear motion, such that the linear moving member moves linearly;

a detector that detects the linear movement of the linear moving member; and a backlash eliminating member that eliminates a backlash between the driving force transmitting member and the linear moving member by applying a force in one direction.

22. A position detecting device according to claim 21, wherein the backlash eliminating member includes a spring.

23. A lens barrel comprising:

an optical system having at least one movable lens element;

an optical system driving member that moves the at least one movable lens element of the optical system;

a driving force transmitting member that rotates to transmit a rotational driving force from a driving source to the optical system driving member;

a linear moving member that converts rotational motion of the driving force transmitting member into a linear motion, such that the linear moving member moves linearly; and a position detector that detects the linear movement of the linear moving member;

wherein the linear moving member and the driving force transmitting member each have lead screws that engage with each other to cause the linear moving member to move linearly as the driving force transmitting member rotates.

24. A lens barrel according to claim 23, wherein the linear moving member moves in a direction parallel to an optical axis of the lens barrel.

25. A lens barrel according to claim 23, further comprising a backlash eliminating member that eliminates a backlash between the driving force transmitting member and the linear moving member by applying a force in one direction.

26. A lens barrel according to claim 25, wherein the backlash eliminating member includes a spring.

27. A lens barrel according to claim 23, wherein the position detector includes a printed circuit board and an electric contact member, a first one of the printed circuit board and the electric contact member attached to the linear moving member, and a second one of the printed circuit board and the electric contact member attached to a stationary portion of the lens barrel.

28. A lens barrel according to claim 27, wherein the printed circuit board does not bend when the linear moving member moves.

29. A lens barrel comprising:

an optical system having at least one movable lens element;

an optical system driving member that moves the at least one movable lens element of the optical system;

a driving force transmitting member that rotates to transmit a rotational driving force from a driving source to the optical system driving member;

a linear moving member that converts rotational motion of the driving force transmitting member into a linear motion, such that the linear moving member moves linearly;

a position detector that detects the linear movement of the linear moving member; and a backlash eliminating member that eliminates a backlash between the driving force transmitting member and the linear moving member by applying a force in one direction.

30. A lens barrel according to claim 29, wherein the backlash eliminating member includes a spring.

* * * * *